US011827726B2

(12) United States Patent
Schneiders et al.

(10) Patent No.: US 11,827,726 B2
(45) Date of Patent: Nov. 28, 2023

(54) PROCESS FOR PRODUCING PEG ACRYLATE-HNBR COPOLYMER

(71) Applicant: ARLANXEO DEUTSCHLAND GMBH, Dormagen (DE)

(72) Inventors: Karola Schneiders, Bergisch Gladbach (DE); Susanna Lieber, Kaiserslautern (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 174 days.

(21) Appl. No.: 17/414,634

(22) PCT Filed: Nov. 26, 2019

(86) PCT No.: PCT/EP2019/082612
§ 371 (c)(1),
(2) Date: Jun. 16, 2021

(87) PCT Pub. No.: WO2020/126353
PCT Pub. Date: Jun. 25, 2020

(65) Prior Publication Data
US 2022/0073666 A1   Mar. 10, 2022

(30) Foreign Application Priority Data

Dec. 17, 2018 (EP) .................... 18213090

(51) Int. Cl.
| C08F 220/28 | (2006.01) |
| C08C 1/14 | (2006.01) |
| C08C 1/15 | (2006.01) |
| C08C 19/02 | (2006.01) |

(52) U.S. Cl.
CPC .......... *C08F 220/286* (2020.02); *C08C 1/145* (2013.01); *C08C 1/15* (2013.01); *C08C 19/02* (2013.01); *C08F 2800/20* (2013.01); *C08F 2810/00* (2013.01)

(58) Field of Classification Search
CPC .. C08F 220/286; C08F 220/44; C08F 236/12; C08F 4/26; C08F 2810/00; C08F 2800/20; C08F 236/06; C08F 236/08; C08C 19/04; C08C 1/15; C08C 1/145; C08C 19/02
See application file for complete search history.

(56) References Cited

U.S. PATENT DOCUMENTS

| 3,700,637 | A | 10/1972 | Finch, Jr. |
| 4,337,329 | A | 6/1982 | Kubo et al. |
| 4,384,081 | A | 5/1983 | Kubo et al. |
| 4,452,951 | A | 6/1984 | Kubo et al. |
| 4,503,196 | A | 3/1985 | Rempel et al. |
| 4,581,417 | A | 4/1986 | Buding et al. |
| 5,208,296 | A * | 5/1993 | Rempel .................. C08C 19/02 525/329.3 |
| 5,210,151 | A | 5/1993 | Rempel et al. |
| 5,783,625 | A | 7/1998 | Mori et al. |
| 7,917,308 | B2 | 3/2011 | Wrana et al. |
| 8,664,340 | B2 | 3/2014 | Obrecht |
| 11,021,596 | B2 | 6/2021 | Salem et al. |
| 2008/0162055 | A1 | 7/2008 | Wrana et al. |
| 2008/0293869 | A1 | 11/2008 | Obrecht |
| 2013/0005916 | A1* | 1/2013 | Ong ...................... C08L 15/005 525/338 |
| 2015/0232584 | A1* | 8/2015 | Rempel .................. C08C 19/08 525/338 |
| 2019/0031804 | A1* | 1/2019 | Salem .................... C08F 236/06 |
| 2019/0284374 | A1 | 9/2019 | Salem et al. |

FOREIGN PATENT DOCUMENTS

| CN | 107200796 | * | 9/2017 |
| DE | 25 39 132 A1 | | 3/1977 |
| DE | 30 46 008 A1 | | 9/1981 |
| DE | 30 46 251 A1 | | 9/1981 |
| DE | 32 27 650 A1 | | 3/1983 |
| DE | 33 29 974 A1 | | 2/1985 |
| DE | 10 2007 024011 A1 | | 11/2008 |
| EP | 0 111 412 A1 | | 6/1984 |
| EP | 1 454 924 A1 | | 8/2004 |
| EP | 1 826 220 A2 | | 8/2007 |
| EP | 1 921 436 A2 | | 5/2008 |
| EP | 2 671 914 A1 | | 11/2013 |
| EP | 3 330 294 A1 | | 6/2018 |
| EP | 3 333 196 A1 | | 6/2018 |
| FR | 2 540 503 A1 | | 8/1984 |
| GB | 1 558 491 | | 1/1980 |
| WO | 03/02613 A1 | | 1/2003 |
| WO | 2004/009655 A1 | | 1/2004 |
| WO | 2013/190371 A1 | | 12/2013 |
| WO | 2013/190373 A1 | | 12/2013 |
| WO | 2015/063162 A1 | | 5/2015 |
| WO | 2017/129535 A1 | | 8/2017 |
| WO | WO-2017129535 A1 * | | 8/2017 ............. C08C 19/02 |

OTHER PUBLICATIONS

Translation of CN 107200796 (Year: 2017).*
In re Patel, 566 Fed. Appx. 1005 (Fed. Cir. 2014), pp. 1-7 of slip opinion.

* cited by examiner

*Primary Examiner* — Robert C Boyle
(74) *Attorney, Agent, or Firm* — Norris McLaughlin, P.A.

(57) ABSTRACT

The present invention relates to a process for producing PEG acrylate-HNBR copolymer which exhibits excellent processability by latex hydrogenation of PEG acrylate-NBR latex to afford PEG acrylate-HNBR latex and subsequent coagulation.

14 Claims, No Drawings

PROCESS FOR PRODUCING PEG ACRYLATE-HNBR COPOLYMER

This application is a 371 of PCT/EP2019/082612, filed Nov. 26, 2019, which claims foreign priority benefit under 35 U.S.C. § 119 of European Patent Application No. 18213090.6, filed Dec. 17, 2018, the disclosures of which are incorporated herein by reference.

The present invention relates to a process for producing PEG acrylate-HNBR copolymer which exhibits excellent processability by latex hydrogenation of PEG acrylate-NBR latex to afford PEG acrylate-HNBR latex and subsequent coagulation.

The rubber industry is constantly looking for improved synthetic rubbers which meet the ever greater requirements of customers. Nitrile rubbers, in particular hydrogenated nitrile rubbers, play a substantial role.

Nitrile rubbers ("NBR"; nitrile rubber copolymer) are to be understood as meaning the rubbers which are co- or terpolymers of at least one $\alpha,\beta$-unsaturated nitrile, at least one conjugated diene and optionally one or more further copolymerizable monomers. Hydrogenated nitrile rubbers ("HNBR") are to be understood as meaning corresponding nitrile rubbers in which the C=C double bonds of the incorporated diene units have been selectively hydrogenated fully or partially.

Both NBR and HNBR have been important in the field of special elastomers for many years. HNBR has an outstanding profile of properties in the form of outstanding oil resistance, good heat resistance and excellent resistance to ozone and chemicals. HNBR also has very good mechanical and performance properties and is characterized by high tear resistance, low abrasion, low permanent deformation after subjection to pressure and tensile stress and good oil resistance but especially by remarkable stability to thermal and oxidative influences.

For this reason it has found widespread application in the most varied fields of application and is used for example for producing seals, hoses, belts and damping elements in the automotive sector, also for stators, well seals and valve seals in the field of oil extraction and for numerous parts of the electrical sector and mechanical and marine engineering. A multiplicity of different types which depending on the field of application are characterized by different monomers, molecular weights, polydispersities and mechanical and physical properties are commercially available. In addition to the standard types there is increasing demand in particular for special types having contents of specific termonomers or particular functionalization.

Numerous HNBR terpolymers having exceptional properties are known from the prior art.

EP-A-3333196 discloses hydrogenated nitrile-diene carboxylic ester copolymers containing 0.1% to 20% by weight of $\alpha,\beta$-ethylenically unsaturated nitrile units, 15% to 74.9% by weight of conjugated diene units and 25% to 65% by weight of $\alpha,\beta$-ethylenically unsaturated carboxylic ester units, wherein at least 15% by weight of the $\alpha,\beta$-ethylenically unsaturated carboxylic ester units are derived from a PEG acrylate.

WO-A-2017/129535 discloses hydrogenated nitrile-butadiene-PEG acrylate copolymers containing 25% to 38% by weight of at least an $\alpha,\beta$-ethylenically unsaturated nitrile unit, 40% to 60% by weight of at least one conjugated diene unit and 10% to 25% by weight of at least one PEG acrylate unit.

WO-A-2015/063162 discloses nitrile-containing copolymers containing 10% to 60% by weight of $\alpha,\beta$-ethylenically unsaturated nitrile unit, 31% to 89% by weight of conjugated diene units and 1% to 9% by weight of $\alpha,\beta$-ethylenically unsaturated monocarboxylic monoester units.

Also known from the prior art are numerous processes for producing HNBR copolymers and HNBR terpolymers by hydrogenation.

Direct hydrogenation of the NBR latex produced in an emulsion polymerization (="primary latex") is known from the prior art (="latex hydrogenation"). This process is described for example in U.S. Pat. Nos. 5,208,296, 5,210,151 and 5,783,625. Typical reaction conditions are a reaction temperature of 80° C. to 160° C., a hydrogen pressure of 3 000 000 to 8 000 000 pascals, a transition metal catalyst from group 8, 9 or 10 and optionally an organic solvent to introduce the catalyst into the aqueous latex.

WO-A-2004/009655 discloses a process for producing a hydrogenated polymer comprising the steps of hydrogenating at least one carbon-carbon double bond of an unsaturated polymer in latex in the presence of hydrazine, an oxidizing compound and a catalyst.

EP-A-1454924 discloses a process for hydrogenating a conjugated diene polymer in the presence of a catalyst system, wherein the conjugated diene polymer is hydrogenated in a latex state.

WO-A-2013/190371 discloses a process for producing a hydrogenated diene-based polymer, wherein a diene-based polymer is subjected to a metathesis decomposition in a first step and to a hydrogenation in a second step, wherein the diene-based polymer is in the form of an aqueous dispersion and both steps are performed in such an aqueous dispersion and both steps are performed in the presence of at least one catalyst.

WO-A-2013/190373 discloses a process for producing a hydrogenated diene-based polymer, wherein the diene-based polymer present in aqueous dispersion is subjected to a hydrogenation in the presence of a catalyst, wherein the catalyst is added to the aqueous dispersion of the diene-based polymer in solid form.

The hydrogenation of unhydrogenated nitrile rubbers in organic solvents is inter alia known from U.S. Pat. No. 3,700,637, DE-A-2 539 132, DE-A-3 046 008, DE-A-3 046 251, DE-A-3 227 650, DE-A-3 329 974, EP-A-0 111 412, FR-B 2 540 503 (="solution hydrogenation").

It is unfortunately not easily predictable what effects the manner of hydrogenation will have on the hydrogenated nitrile rubber latex produced, the coagulated (=precipitated) hydrogenated nitrile rubber copolymer produced therefrom and the compositions and vulcanizates produced therefrom.

The hydrogenation of nitrile rubbers typically results in an increasing of the Mooney viscosity by a factor of about 2.5 (EP-A-1 921 436). The lowest Mooney viscosity of HNBR is thus more than twice that of the nitrile rubber to be hydrogenated, i.e. the so-called NBR feedstock. Although Mooney viscosities of 70 MU are suitable for many applications this high Mooney value causes severe problems during injection moulding. The flow properties of the rubber are dependent on the compound viscosity. An excessive compound viscosity can result in insufficient mould filling.

Options for reducing viscosities such as for example the use of plasticizers or the action of shear forces results for example in undesired changes in final product properties.

A method for reducing Mooney viscosity known from the prior art is the performance of a metathesis reaction with the unhydrogenated nitrile rubber.

WO-A-2003/002613 and EP-A-1826220 disclose a process for producing nitrile rubber, wherein the nitrile rubber is subjected to a metathesis reaction in the presence of a co-olefin and a metathesis catalyst.

This results in improvements to processability and to the vulcanization process. However, one disadvantage is the need to perform an additional reaction step which consumes a further costly catalyst and causes changes in the polymer chain.

The known production processes and the thus produced hydrogenated nitrile rubbers are thus not yet satisfactory for further processing and certain applications.

A problem addressed by the present invention is accordingly that of providing a process for producing PEG acrylate-HNBR copolymers having improved processing properties while retaining their exceptional vulcanizate and compound properties.

The solution to the problem provided by the present invention is a process for producing PEG acrylate-HNBR copolymer, characterized in that a PEG acrylate-NBR latex is subjected to a hydrogenation and subsequently a coagulation, characterized in that the PEG acrylate-NBR latex contains
- (a) 0% to 60% by weight, preferably 15% to 40% by weight, particularly preferably 15% to 35% by weight, of at least one α,β-ethylenically unsaturated nitrile unit,
- (b) 20% to 80% by weight, preferably 30% to 65% by weight, particularly preferably 35% to 65% by weight, of at least one conjugated diene unit and
- (c) 10% to 60% by weight, preferably 10% to 50% by weight, particularly preferably 20% to 50% by weight, of a PEG acrylate unit derived from a PEG acrylate of general formula (I)

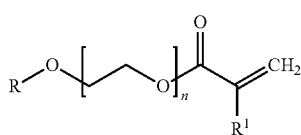

formula (I)

based on the total amount of monomer units, wherein
- R is hydrogen or branched or unbranched $C_1$-$C_{20}$-alkyl, preferably $C_1$-$C_{10}$-alkyl, particularly preferably $C_1$-$C_4$-alkyl and very particularly preferably methyl, ethyl or butyl,
- n is 1 to 8, preferably 2 to 8, particularly preferably 2 to 5 and very particularly preferably 2 or 3 and
- $R^1$ is hydrogen or methyl, preferably methyl.

The invention is described in more detail in the context of the embodiments which follow. It is noted here that the scope of the invention includes any desired possible combinations of the components, value ranges and process parameters recited above or below mentioned generally or in preferred ranges.

The term "copolymer" comprises polymers having more than one monomer unit.

In one embodiment of the invention the PEG acrylate-NBR latex/the PEG acrylate-HNBR latex produced therefrom and the PEG acrylate-HNBR copolymer are for example exclusively derived from the three monomer types (a), (b) and (d) and is therefore a terpolymer.

Likewise comprised by the term copolymer are also for example quaternary polymers, derived from the three monomer types (a), (b) and (c) and a further copolymerizable monomer unit (d).

In the context of the present invention the term "PEG acrylate-HNBR copolymer" is to be understood as meaning a copolymer containing at least one α,β-ethylenically unsaturated nitrile unit, at least one conjugated diene unit and at least one PEG acrylate unit of general formula (I). The term thus also comprises copolymers having two or more α,β-ethylenically unsaturated nitrile monomer units, two or more conjugated diene monomer units and two or more PEG acrylate units of general formula (I).

The term "hydrogenated" describes that the degree of hydrogenation of the C=C double bonds of the incorporated conjugated diene monomer in the hydrogenated PEG acrylate-HNBR copolymer is 50% to 100%, preferably 90% to 100%, particularly preferably 95% to 100% and very particularly preferably 99% to 100%.

PEG Acrylate-NBR Latex

In the context of the present invention the "PEG acrylate-NBR latex" employed in the present invention is an aqueous dispersion of unhydrogenated PEG acrylate-NBR copolymer containing repeating units derived from at least one α,β-ethylenically unsaturated nitrile, at least one conjugated diene and at least one PEG acrylate of general formula (I).

α,β-Ethylenically Unsaturated Nitrile

As the α,β-ethylenically unsaturated nitrile forming the α,β-ethylenically unsaturated nitrile unit (a) any known α,β-ethylenically unsaturated nitrile may be employed. Preference is given to ($C_3$-$C_5$)-α,β-ethylenically unsaturated nitriles such as acrylonitrile, α-haloacrylonitrile such as for example α-chloracrylonitrile and α-bromacrylonitrile, α-alkylacrylonitrile such as for example methacrylonitrile, ethacrylonitrile or mixtures of two or more α,β-ethylenically unsaturated nitriles. Acrylonitrile, methacrylonitrile, ethacrylonitrile or mixtures thereof are particularly preferred. Acrylonitrile is very particularly preferred.

The amount of α,β-ethylenically unsaturated nitrile units is typically in the range from 10% to 60% by weight, preferably 15% to 40% by weight, particularly preferably 15 to 35% by weight, based on the total amount of monomer units in the PEG acrylate-NBR latex.

Conjugated Diene

As the conjugated diene forming the conjugated diene unit (b) a conjugated diene of any kind may be employed, in particular conjugated $C_4$-$C_{12}$-dienes. 1,3-Butadiene, isoprene, 2,3-dimethylbutadiene, 1,3-pentadiene (piperylene) oder mixtures thereof are particularly preferred. 1,3-Butadiene and isoprene or mixtures thereof are especially preferred. 1,3-Butadiene is very particularly preferred.

The amount of conjugated diene units is typically in the range from 20% to 80% by weight, preferably 30% to 65% by weight and particularly preferably 35 to 60% by weight based on the total amount of monomer units in the PEG acrylate-NBR latex.

PEG Acrylate

Employable as the PEG acrylate forming PEG acrylate unit (c) is a PEG acrylate of general formula (I)

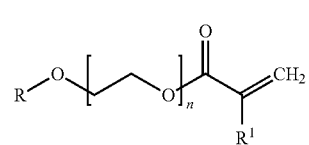

(formula I)

wherein
- R is hydrogen or branched or unbranched $C_1$-$C_{20}$-alkyl, preferably $C_1$-$C_{10}$-alkyl, particularly preferably $C_1$-$C_4$-alkyl and very particularly preferably methyl, ethyl or butyl,
- n is 1 to 8, preferably 2 to 8, particularly preferably 2 to 5 and very particularly preferably 2 or 3 and
- $R^1$ is hydrogen or methyl, preferably methyl.

The amount of PEG acrylate units is typically in the range from 10% to 60% by weight, preferably 10% to 50% by weight and particularly preferably 20 to 50% by weight based on the total amount of monomer units in the PEG acrylate-NBR latex.

In the context of the present invention the term "(meth)acrylate" iso be understood as meaning "acrylate" and "methacrylate". When the radical $R^1$ in general formula (I) is CH3-a methacrylate is concerned. In the context of the present invention the term "polyethylene glycol" or the abbreviation "PEG" represents both monoethylene glycol sections having one ethylene glycol repeating unit (PEG-1; n=1) and polyethylene glycol sections having 2 to 8 ethylene glycol repeating units (PEG-2 to PEG-8; n=2 to 8). The term "PEG acrylate" is also abbreviated to PEG-X-(M)A wherein "X" represents the number of repeat ethylene glycol units, "MA" stands for methacrylate and "A" stands for acrylate. In the context of the present invention acrylate units derived from PEG acrylates of general formula (I) are referred as "PEG acrylate unit".

Preferred PEG acrylate units are derived from the PEG acrylates of formulae 1 to 8 which follow, wherein n=2, 3, 4, 5, 6, 7, 8, 9, 10, 11 or 12, preferably 2, 3, 4, 5, 6, 7 or 8, particularly preferably 2, 3, 4 or 5 and very particularly preferably 2 or 3:

Ethoxy polyethylene glycol acrylate
(Formula no. 1)

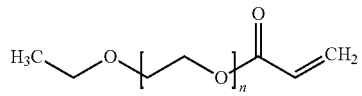

Ethoxy polyethylene glycol methacrylate
(Formula no. 2)

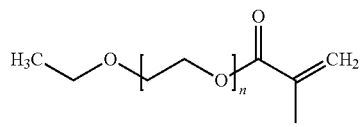

Propoxy polyethylene glycol acrylate
(Formula no. 3)

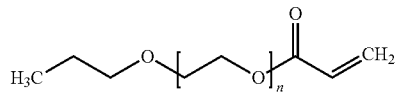

Propoxy polyethylene glycol methacrylate
(Formula no. 4)

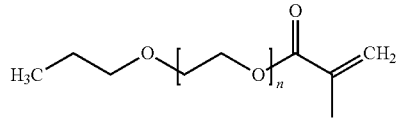

Butoxy polyethylene glycol acrylate
(Formula no. 5)

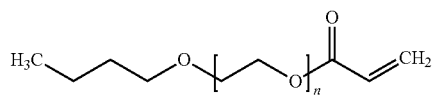

Butoxy polyethylene glycol methacrylate
(Formula no. 6)

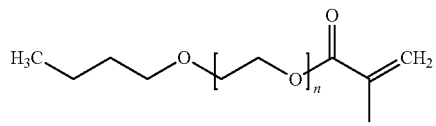

Ethylhexyloxy polyethylene glycol acrylate
(Formula no. 7)

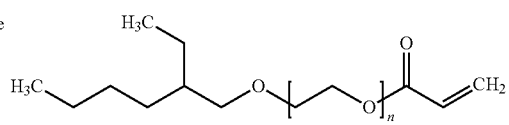

Ethylhexyloxy polyethylene glycol methacrylate
(Formula no. 8)

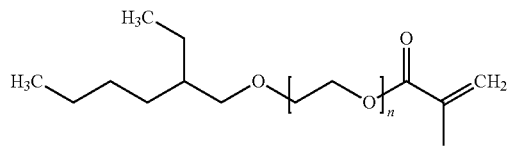

Other commonly used designations for ethoxy polyethylene glycol acrylate (formula no. 1) are for example poly(ethylene glycol) ethyl ether acrylate, ethoxy-PEG acrylate, ethoxy poly(ethylene glycol) monoacrylate or poly(ethylene glycol) monoethyl ether monoacrylate.

In an alternative embodiment the PEG acrylate-NBR latex contains as PEG acrylate units ethoxy, butoxy or ethylhexyloxy polyethylene glycol (meth)acrylate having 2 to 12 ethylene glycol repeating units, particularly preferably ethoxy or butoxy polyethylene glycol (meth)acrylate having 2 to 5 ethylene glycol repeating units and very particularly preferably ethoxy or butoxy polyethylene glycol (meth)acrylate having 2 or 3 ethylene glycol repeating units. Greatest preference is given to butoxy polyethylene glycol (meth)acrylate (BDGMA).

These PEG acrylates are commercially available for example from Arkema under the trade name Sartomer®, from Evonik under the trade name Visiomer® or from Sigma Aldrich.

In a preferred embodiment the PEG acrylate-NBR latex contains 15% to 35% by weight of α,β-ethylenically unsaturated nitrile units, particularly preferably 20% to 25% by weight of α,β-ethylenically unsaturated nitrile units, 35% to 60% by weight of conjugated diene units, particularly preferably 45% to 60% by weight of conjugated diene units, and 20% to 50% by weight of PEG acrylate units, particularly preferably 20% to 30% by weight of PEG acrylate units, derived from a PEG acrylate of general formula (I).

Further Copolymerizable Monomers

In addition to the α,β-ethylenically unsaturated nitrile unit, the conjugated diene unit and the PEG acrylate unit the PEG acrylate-NBR latices may also contain one or more further copolymerizable monomers.

Carboxyl-Containing Monomer

In an alternative embodiment the PEG acrylate-NBR latex may also contain carboxyl-containing monomers, i.e. copolymerizable carboxylic acids. Carboxyl-containing monomers which form carboxyl-containing monomer units are to be understood as meaning copolymerizable monomers which either have at least one carboxyl group in the monomer molecule or which may be reacted in-situ to liberate at least one carboxyl group.

Contemplated carboxyl-containing copolymerizable monomers include for example α,β-unsaturated monocarboxylic acids, α,β-unsaturated dicarboxylic acids, monoesters thereof or the corresponding anhydrides. Preferred carboxyl-containing copolymerizable monomers are α,β-unsaturated monocarboxylic acids and α,β-unsaturated dicarboxylic acids and monoesters thereof.

Preferably employable α,β-unsaturated monocarboxylic acids include acrylic acid and methacrylic acid. Also employable are hydroxyalkyl acrylates and hydroxyalkyl methacrylate in which the carbon atom number of the hydroxyalkyl groups is 1-12, preferably 2-hydroxyethyl acrylate, 2-hydroxyethyl methacrylate and 3-hydroxypropyl acrylate. Likewise employable are epoxy-containing esters such as for example glycidyl methacrylate.

Also employable as carboxyl-containing monomers are α,β-unsaturated dicarboxylic acids, preferably maleic acid, fumaric acid, itaconic acid, citraconic acid and mesaconic acid, or α,β-unsaturated dicarboxylic anhydrides, preferably maleic anhydride, fumaric anhydride, itaconic anhydride, citraconic anhydride and mesaconic anhydride.

It is further possible to employ monoesters of α,β-unsaturated dicarboxylic acids, for example in the form of alkyl, preferably $C_1$-$C_{10}$-alkyl, in particular ethyl, n-propyl, isopropyl, n-butyl, tert-butyl, n-pentyl or n-hexyl, cycloalkyl, preferably $C_5$-$C_{12}$-cycloalkyl, particularly preferably $C_6$-$C_{12}$-cycloalkyl, alkylcycloalkyl, preferably $C_6$-$C_{12}$-alkylcycloalkyl, particularly preferably $C_7$-$C_{10}$-alkylcycloalkyl, and aryl, preferably $C_6$-$C_{14}$-aryl monoesters.

Examples of α,β-unsaturated dicarboxylic acid monoesters comprise monoalkyl maleates, preferably monomethyl maleate, monoethyl maleate, monopropyl maleate and mono-n-butyl maleate;

monocycloalkyl maleates, preferably monocyclopentyl maleate, monocyclohexyl maleate and monocycloheptyl maleate;

monoalkyl cycloalkyl maleates, preferably monomethyl cyclopentyl maleate and monoethyl cyclohexyl maleate;

monoaryl maleates, preferably monophenyl maleate;

monobenzyl maleates, preferably monobenzyl maleate;

monoalkyl fumarates, preferably monomethyl fumarate, monoethyl fumarate, monopropyl fumarate and mono-n-butyl fumarate;

monocycloalkyl fumarates, preferably monocyclopentyl fumarate, monocyclohexyl fumarate and monocycloheptyl fumarate;

monoalkyl cycloalkyl fumarates, preferably monomethyl cyclopentyl fumarate and monoethyl cyclohexyl fumarate;

monoaryl fumarates, preferably monophenyl fumarate;

monobenzyl fumarates, preferably monobenzyl fumarate;

monoalkyl citraconates, preferably monomethyl citraconate, monoethyl citraconate, monopropyl citraconate and mono-n-butyl citraconate;

monocycloalkyl citraconates, preferably monocyclopentyl citraconate, monocyclohexyl citraconate and monocycloheptyl citraconate;

monoalkyl cycloalkyl citraconates, preferably monomethyl cyclopentyl citraconate and monoethyl cyclohexyl citraconate;

monoaryl citraconates, preferably monophenyl citraconate;

monobenzyl citraconates, preferably monobenzyl citraconate;

monoalkyl itaconates, preferably monomethyl itaconate, monoethyl itaconate, monopropyl itaconate and mono-n-butyl itaconate;

monocycloalkyl itaconates, preferably monocyclopentyl itaconate, monocyclohexyl itaconate and monocycloheptyl itaconate;

monoalkyl cycloalkyl itaconates, preferably monomethyl cyclopentyl itaconate and monoethyl cyclohexyl itaconate;

monoaryl itaconates, preferably monophenyl itaconate;

monobenzyl itaconates, preferably monobenzyl itaconate;

monoalkyl mesaconates, preferably monoethyl mesaconate.

Contemplated copolymerizable monomers further comprise for example esters of α,β-unsaturated monocarboxylic acids. Employable esters of α,β-unsaturated monocarboxylic acids are the alkyl esters and alkoxyalkyl esters thereof. Alkyl esters, in particular $C_1$-$C_{18}$ alkyl esters of α,β-unsaturated monocarboxylic acids, are preferred, particular preference being given to alkyl esters, in particular $C_1$-$C_{18}$ alkyl esters of acrylic acid or methacrylic acid, in particular methyl acrylate, ethyl acrylate, propyl acrylate, n-butyl acrylate, tert-butyl acrylate, 2-ethylhexyl acrylate, n-dodecyl acrylate, methyl methacrylate, ethyl methacrylates, butyl methacrylate and 2-ethylhexyl methacrylate. Also preferred are alkoxyalkyl esters of α,β-unsaturated monocarboxylic acids, particularly preferably alkoxy alkyl esters of acrylic acid or methacrylic acid, in particular $C_2$-$C_{12}$-alkoxyalkyl esters of acrylic acid or of methacrylic acid, very particularly preferably methoxymethyl acrylate, methoxyethyl (meth)acrylate, ethoxyethyl (meth)acrylate and methoxyethyl (meth)acrylate. Also employable are mixtures of alkyl esters, such as for example those recited above, with alkoxyalkyl esters, for example in the form of those recited above. Also employable are cyanoalkyl acrylates and cyanoalkyl methacrylates having 2-12 carbon atoms in the cyanoalkyl group, preferably α-cyanoethyl acrylate, β-cyanoethyl acrylate and cyanobutyl methacrylate. Also employable are fluorine-substituted benzyl-containing acrylates or methacrylates, preferably fluorobenzyl acrylate and fluorobenzyl methacrylate. Also employable are fluoroalkyl-containing acrylates and methacrylates, preferably trifluoroethyl acrylate and tetrafluoropropyl methacrylate. Also employable are amino-containing α,β-unsaturated carboxylic esters such as dimethylaminomethyl acrylate and diethylaminoethyl acrylate.

It is further possible to employ diesters of α,β-unsaturated dicarboxylic acids, for example in the form of alkyl, preferably $C_1$-$C_{10}$-alkyl, in particular ethyl, n-propyl, isopropyl, n-butyl, tert-butyl, n-pentyl or n-hexyl, cycloalkyl, preferably $C_5$-$C_{12}$-cycloalkyl, particularly preferably $C_6$-$C_{12}$-cycloalkyl, alkylcycloalkyl, preferably $C_6$-$C_{12}$-alkylcycloalkyl, particularly preferably $C_7$-$C_{10}$-alkylcycloalkyl, and aryl, preferably $C_6$-$C_{14}$-aryl, diesters, wherein mixed esters may is each case also be concerned.

Examples of α,β-unsaturated dicarboxylic acid diesters comprise
dialkyl maleates, preferably dimethyl maleate, diethyl maleate, dipropyl maleate and di-n-butyl maleate;
dicycloalkyl maleates, preferably dicyclopentyl maleate, dicyclohexyl maleate and dicycloheptyl maleate;
dialkylcycloalkyl maleates, preferably dimethylcyclopentyl maleate and diethylcyclohexyl maleate;
diaryl maleates, preferably diphenyl maleate;
dibenzyl maleates, preferably dibenzyl maleate;
dialkyl fumarates, preferably dimethyl fumarate, diethyl fumarate, dipropyl fumarate and di-n-butyl fumarate;
dicycloalkyl fumarates, preferably dicyclopentyl fumarate, dicyclohexyl fumarate and dicycloheptyl fumarate;
dialkylcycloalkyl fumarates, preferably dimethylcyclopentyl fumarate and diethylcyclohexyl fumarate;
diaryl fumarates, preferably diphenyl fumarate;
dibenzyl fumarates, preferably dibenzyl fumarate;
dialkyl citraconates, preferably dimethyl citraconate, diethyl citraconate, dipropyl citraconate and di-n-butyl citraconate;
dicycloalkyl citraconates, preferably dicyclopentyl citraconate, dicyclohexyl citraconate and dicycloheptyl citraconate;
dialkylcycloalkyl citraconates, preferably dimethylcyclopentyl citraconate and diethylcyclohexyl citraconate;
diaryl citraconates, preferably diphenyl citraconate;
dibenzyl citraconates, preferably dibenzyl citraconate;
dialkyl itaconates, preferably dimethyl itaconate, diethyl itaconate, dipropyl itaconate and di-n-butyl itaconate;
dicycloalkyl itaconates, preferably dicyclopentyl itaconate, dicyclohexyl itaconate and dicycloheptyl itaconate;
dialkylcycloalkyl itaconates, preferably dimethylcyclopentyl itaconate and diethylcyclohexyl itaconate;
diaryl itaconates, preferably diphenyl itaconate;
dibenzyl itaconates, preferably dibenzyl itaconate and dialkyl mesaconates, preferably diethyl mesaconate.

The amount of further monomer units in the PEG acrylate-NBR latex is in the range from 0% to 30% by weight, preferably from 1% to 20% by weight and particularly preferably from 2 to 7% by weight based on the total amount of monomer units in the PEG acrylate-NBR latex.

PEG Acrylate-HNBR Latex

In accordance with this invention the "PEG acrylate-HNBR latex" obtained by the process of the invention is an aqueous dispersion of PEG acrylate-HNBR copolymer containing repeating units derived from at least one α,β-unsaturated nitrile, at least one conjugated diene and at least one copolymerizible PEG acrylate of general formula (I), wherein the degree of hydrogenation of the C=C double bonds of the incorporated conjugated diene monomer in the PEG acrylate-HNBR copolymer is 50% to 100%, preferably 90% to 100%, particularly preferably 95% to 100% and very particularly preferably 99% to 100%. This means that in the PEG acrylate-HNBR latex 50% to 100%, preferably 90% to 100%, particularly preferably 95% to 100% and very particularly preferably 99% to 100% of the originally present double bonds in the PEG acrylate-NBR copolymer are hydrogenated.

Process for Producing PEG Acrylate-HNBR Latex

Polymerization

This typically comprises initially producing the unhydrogenated PEG acrylate-NBR latex via an emulsion polymerization of the corresponding monomers according to the invention as recited above.

Processes for producing comparable NBR latices are known to those skilled in the art, for example from W. Hofmann, Rubber Chem. Technol. 36 (1963) 1 and Ullmann's Encyclopedia of Industrial Chemistry, VCH Verlagsgesellschaft, Weinheim, 1993, p 255-261.

Hydrogenation of the PEG Acrylate-NBR Latex

This is followed by a homogeneously or else heterogeneously catalyzed hydrogenation of the aqueous PEG acrylate-NBR latex to afford the PEG acrylate-HNBR latex.

In the context of the present invention hydrogenation is to be understood as meaning a conversion of the double bonds present in the PEG acrylate-NBR latex to an extent of at least 50%, preferably 70-100%, particularly preferably 80% to 100%. Residual double bond contents in the HNBR of 0% to 8% are also particularly preferred.

Practical performance of the latex hydrogenation is known to those skilled in the art. It is typically carried out by subjecting the PEG acrylate-NBR latex to be hydrogenated to hydrogen at a temperature of 100° C. to 150° C. and a pressure of 50 to 150 bar for 1 to 10 hours.

The emulsifier typically originates from polymerization and is not subject to any particular limitations. Typically employed are fatty acids, resin acids, α-olefin-sulfonates or SDS (sodium dodecyl sulfate), preferably SDS.

In the process according to the invention the solids concentration of the PEG acrylate-NBR latex is 10% to 50% by weight, preferably 15% to 40% by weight and particularly preferably from 15% to 25% by weight based on the total weight of the PEG acrylate-NBR latex.

The process according to the invention for hydrogenation is typically performed in the presence of at least one hydrogenation catalyst. The type of hydrogenation catalyst is not subject to any particular limitations. In a preferred embodiment a noble metal-containing hydrogenation catalyst stable toward water is used. In a further preferred embodiment a catalyst of general formula (A) or (B) is employed (A)

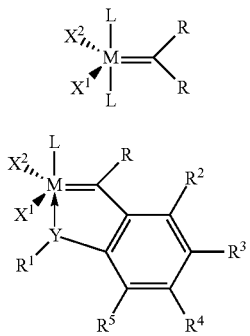

(B)

wherein
M is osmium or ruthenium,
X¹ and X² are identical or different anionic ligands, preferably halogens,
L are identical or different ligands, preferably unladen electron donors, wherein in general formula (A) both ligands L may be connected to one another and form a bidentate ligand,
R, $R^2$, $R^3$, $R^4$ and $R^5$ are identical or different and are in each case hydrogen, alkyl, preferably $C_1$-$C_{30}$-alkyl, cycloalkyl, preferably $C_3$-$C_{20}$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulfonyl, preferably $C_1$-$C_{20}$-alkylsulfonyl, or alkylsulfinyl, preferably $C_1$-$C_{20}$-alkylsulfinyl, wherein these radicals are in each case optionally substituted with one or more alkyl, halogen, alkoxy, aryl or heteroaryl radicals, or alternatively the two radicals R together with the common carbon atom to which they are bonded are bridged to form a cyclic group which may have an aliphatic or aromatic nature, which may be substituted and which may comprise one or more heteroatoms
Y is oxygen (O), sulfur (S), an N—R¹ radical or a P—R¹ radical, wherein R¹ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulfonyl or alkylsulfinyl radical in each case optionally substituted with one or more alkyl, halogen, alkoxy, aryl or heteroaryl radicals and
$R^6$ is hydrogen or an alkyl, alkenyl or aryl radical,
or
a catalyst of general formula (C)

$$MQ_x \cdot aH_2O \qquad (C)$$

wherein
M is a group VIII transition noble metal, preferably ruthenium, rhodium, osmium or iridium,
Q is identical or different and is a hydride or another anion,
x is 1, 2, or 3 and
a is in the range from 0 to 3,
or
a catalyst of general formula (D)

$$RhQ'L_y \qquad (D)$$

wherein
Q' is a hydride or another anion,
y is 1, 2, 3 or 4 and
L is identical or different and is a water-soluble ligand,
or
a catalyst of general formula (E)

$$RhQL_x \qquad (E)$$

wherein Q is a hydrogen or an anion, preferably a halide and particularly preferably a chloride or bromide,
wherein L is a ligand of general formula $R_mB$, wherein R is a $C_1$-$C_3$-alkyl, a $C_4$-$C_8$-cycloalkyl, a $C_6$-$C_{15}$-aryl or a $C_7$-$C_{15}$-aralkyl, B is a phosphorus, arsenic, sulfur or sulfur oxide and m is 2 or 3, preferably 2 when B is sulfur or sulfur oxide and 3 when B is phosphorus or arsenic, and wherein x is 2, 3 or 4, preferably X is 3 when Q is a halogen and 4 when Q is a hydrogen.

In a particularly preferred embodiment of the process according to the invention the hydrogenation of the PEG acrylate-NBR latex is carried out in the presence of a catalyst of general formula (B), wherein M is ruthenium and L is an N-hetrocyclic carbene (NHC) ligand. In a very particularly preferred embodiment the hydrogenation of the PEG acrylate-NBR latex is carried out in the presence of 1,3-bis(2,4,6-trimethylphenyl)-2-imidazolidinylidene)di-chloro(o-isopropoxyphenylmethylene)ruthenium.

The Amount of Employed Hydrogenation Catalyst is Typically 0.01 to 0.2 Phr, Preferably 0.2 to 0.1 Phr.

Process for Producing PEG Acrylate-HNBR Copolymer

Latex Coagulation (of the PEG Acrylate-HNBR Latex to Afford PEG Acrylate-HNBR Copolymer)

The PEG acrylate-HNBR latex produced during the process according to the invention is subsequently coagulated (=precipitated) to afford the PEG acrylate-HNBR copolymer.

Before or during the latex coagulation the PEG acrylate-HNBR latex according to the invention may be admixed with one or more aging inhibitors. Phenolic, aminic and other aging inhibitors are suitable therefor.

Suitable phenolic aging inhibitors are alkylated phenols, styrenated phenol, sterically hindered phenols such as 2,6-di-tert-butylphenol, 2,6-di-tert-butyl-p-cresol (BHT), 2,6-di-tert-butyl-4-ethylphenol, ester-containing sterically hindered phenols, thioether-containing sterically hindered phenols, 2,2'-methylene-bis-(4-methyl-6-tert-butylphenol) (BPH) and sterically hindered thiobisphenols.

If discoloration of the rubber is immaterial aminic aging inhibitors, for example mixtures of diaryl-p-phenylenediamines (DTPD), octylated diphenylamine (ODPA), phenyl-α-naphthylamine (PAN), phenyl-β-naphthylamine (PBN), preferably those based on phenylenediamine, are also employed. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis-1,4-(1,4-dimethylpentyl)-p-phenylenediamine (77PD) etc.

Other aging inhibitors include phosphites such as tris (nonylphenyl)phosphite, polymerized 2,2,4-trimethyl-1,2-dihydroquinoline (TMQ), 2-mercaptobenzimidazole (MBI), methyl-2-mercaptobenzimidazole (MMBI), zinc methylmercaptobenzimidazole (ZMMBI). The phosphites are often used in combination with phenolic aging inhibitors. TMQ, MBI and MMBI are known as suitable aging inhibitors for non-hydrogenated nitrile rubbers subjected to peroxidic vulcanization.

For the coagulation the latex is adjusted to a pH known to those skilled in the art, namely by addition of a base, preferably ammonia or sodium or potassium hydroxide, or an acid, preferably sulfuric acid or acetic acid.

In one embodiment of the process the coagulation is performed using at least one salt selected from the group consisting of aluminium, calcium, magnesium, sodium, potassium and lithium salts.

Monovalent or divalent anions are typically used as the anions of these salts. Preference is given to halides, particularly preferably chloride, nitrate, sulfate, hydrogencarbonate, carbonate, formate and acetate.

Suitable salts are for example sodium chloride, potassium chloride, calcium chloride, magnesium chloride, sodium nitrate, potassium nitrate, sodium sulfate, potassium sulfate, sodium hydrogencarbonate, potassium hydrogencarbonate, sodium carbonate, potassium carbonate, aluminium sulfate, potassium aluminium sulfate (potassium alum), sodium aluminium sulfate (sodium alum), sodium acetate, calcium acetate and calcium formate. If a water-soluble calcium salt is used for the latex coagulation calcium chloride is preferred.

The salts are added in an amount of 0.05% to 10% by weight, preferably 0.5% to 8% by weight, particularly preferably 1% to 5% by weight, based on the solids content of the PEG acrylate-HNBR latex dispersion.

In addition to at least one salt from the group defined above precipitation assistants may also be employed in the coagulation. Suitable precipitation assistants include water-soluble polymers for example. These are nonionic, anionic or cationic.

Examples of nonionic polymeric precipitation assistants are modified celluloses such as hydroxyalkylcellulose or methylcellulose and adducts of ethylene oxide and propylene oxide onto compounds bearing acidic hydrogen. Examples of compounds bearing acidic hydrogen are: fatty acid, sugars such as sorbitol, mono- and diglycerides of fatty acid, phenol, alkylated phenols, (alkyl)phenol/formaldehyde condensates etc. The addition products of ethylene oxide and propylene oxide onto these compounds may have a random or block construction. Among these products preference is given to those whose solubility decreases with increasing temperature. Characteristic clouding temperatures are in the range 0° C. to 100° C., in particular in the range from 20° C. to 70° C.

Examples of anionic polymeric precipitation assistants are homopolymers and copolymers of (meth)acrylic acid, maleic acid, maleic anhydride etc. The Na salt of polyacrylic acid is preferred.

Cationic polymeric precipitation assistants are typically based on polyamines and on homo- and copolymers of (methy)acrylamide. Polymethacrylamides and polyamines, especially based on epichlorohydrin and dimethylamine, are preferred. The amounts of polymeric precipitation assistants are 0.01 to 5 parts by weight, preferably 0.05 to 2.5 parts by weight, based on 100 parts by weight of PEG acrylate-HNBR copolymer.

The use of other precipitation assistants is also conceivable. However, it is readily possible to perform the process according to the invention in the absence of additional precipitation assistants. The PEG acrylate-HNBR latex used for coagulation advantageously has a solids concentration in the range from 1% to 40%, preferably in the range from 5% to 35% and particularly preferably in the range from 15% to 30% by weight.

The latex coagulation is performed in the temperature range of 10° C. to 110° C., preferably from 20° C. to 100° C., particularly preferably 50° C. to 98° C. The latex coagulation may be carried out continuously or discontinuously, preferably continuously.

In an alternative embodiment the PEG-acrylate-HNBR latex typically separated from unconverted monomers may also be treated with acids in a pH range of 6, preferably 4, particularly preferably 2, to precipitate the polymer. All mineral and organic acids which allow adjustment to the chosen pH ranges may be used for the precipitation. It is preferable to employ mineral acids for the pH adjustment. The polymer is subsequently separated from the dispersion in a manner customary to those skilled in the art. This too may be carried out continuously or discontinuously, preferably continuously.

Washing and Drying of the Coagulated PEG Acrylate-HNBR Copolymer

After coagulation the PEG acrylate-HNBR copolymer is typically in the form of so-called crumb. The washing of the coagulated HNBR is therefore also known as crumb washing. This washing may employ either deionized water or non-deionized water. The washing is carried out at a temperature in the range from 15° C. to 90° C., preferably at a temperature in the range from 20° C. to 80° C. The amount of the scrubbing water is 0.5 to 20 parts by weight, preferably 1 to 10 parts by weight and particularly preferably 1 to 5 parts by weight based on 100 parts by weight of PEG acrylate-HNBR copolymer. It is preferable when the rubber crumb is subjected to a multistage washing, wherein the rubber crumb is partially dewatered between the individual washing stages. The residual moisture of the crumb between the individual washing stages is in the range from 5% to 50% by weight, preferably in the range from 7% to 25% by weight. The number of washing stages is typically 1 to 7, preferably 1 to 3. The washing is performed discontinuously or continuously. It is preferable to employ a multistage continuous process, wherein countercurrent washing is preferred for sparing use of water. Once washing is complete it is proven advantageous to dewater the PEG acrylate-HNBR copolymer crumb according to the invention. Drying of the previously dewatered PEG acrylate-HNBR copolymer according to the invention is carried out in a dryer, suitable examples including fluidized bed dryers or plate dryers. The temperatures in the drying are 80° C. to 150° C. Preference is given to a drying comprising a temperature program, wherein the temperature is reduced toward the end of the drying process.

The PEG acrylate-HNBR copolymers produced according to the invention typically have a number-average molecular weight (Mn) of 10 000 g/mol to 2 000 000 g/mol, preferably 50 000 g/mol to 1 000 000 g/mol, particularly preferably 100 000 g/mol to 500 000 g/mol and very particularly preferably 150 000 g/mol to 300 000 g/mol.

The PEG acrylate-HNBR copolymers produced according to the invention typically have a polydispersity PDI=Mw/Mn, wherein Mw is the weight-average molecular weight and Mn the number-average molecular weight, in the range from 2.0 to 6.0 and preferably in the range from 2.0 to 5.0.

Particularly preferred PEG acrylate-HNBR copolymers according to the invention are those produced by latex hydrogenation of copolymers of
  acrylonitrile/butadiene/PEG acrylate;
  acrylonitrile/butadiene/PEG acrylate/acrylic acid, acrylonitrile/butadiene/PEG acrylate/methacrylic acid, acrylonitrile/butadiene/PEG acrylate/mono-n-butyl maleate;
  acrylonitrile/butadiene/PEG acrylate/methyl acrylate, acrylonitrile/butadiene/PEG acrylate/ethyl acrylate, acrylonitrile/butadiene/PEG acrylate/butyl acrylate, acrylonitrile/butadiene/PEG acrylate/2-ethylhexyl acrylate;

acrylonitrile/butadiene/PEG acrylate/methoxymethyl (meth)acrylate, acrylonitrile/butadiene/PEG acrylate/methoxyethyl (meth)acrylate, acrylonitrile/butadiene/PEG acrylate/ethoxyethyl acrylate, acrylonitrile/butadiene/PEG acrylate/acrylic acid/butyl acrylate, acrylonitrile/butadiene/PEG acrylate/methacrylic acid/butyl acrylate and acrylonitrile/butadiene/PEG acrylate/mono-n-butyl maleate/butyl acrylate.

Very particularly preferred PEG acrylate-HNBR copolymers are those produced by latex hydrogenation of copolymers of acrylonitrile/butadiene/BDGMA, acrylonitrile/butadiene/BDGMA/acrylic acid, acrylonitrile/butadiene/BDGMA/methacrylic acid, acrylonitrile/butadiene/BDGMA/mono-n-butyl maleate, acrylonitrile/butadiene/BDGMA/methyl acrylate, acrylonitrile/butadiene/BDGMA/ethyl acrylate, acrylonitrile/butadiene/BDGMA/butyl acrylate, acrylonitrile/butadiene/BDGMA/2-ethylhexyl acrylate acrylonitrile/butadiene/BDGMA/methoxymethyl (meth) acrylate, acrylonitrile/butadiene/BDGMA/methoxyethyl (meth)acrylate, acrylonitrile/butadiene/BDGMA/ethoxyethyl acrylate acrylonitrile/butadiene/BDGMA/acrylic acid/butyl acrylate, acrylonitrile/butadiene/BDGMA/methacrylic acid/butyl acrylate and acrylonitrile/butadiene/BDGMA/mono-n-butyl maleate/butyl acrylate.

Vulcanizable Mixtures Containing PEG Acrylate-HNBR Copolymer

The present invention further provides vulcanizable mixtures containing PEG acrylate-HNBR copolymer according to the invention and at least one crosslinker. In a preferred embodiment vulcanizable mixtures additionally containing at least one filler are concerned.

Suitable crosslinkers include for example peroxidic crosslinkers such as bis(2,4-dichlorobenzyl) peroxide, dibenzoyl peroxide, bis(4-chlorobenzoyl) peroxide, 1,1-bis(t-butylperoxy)-3,3,5-trimethylcyclohexane, tert-butyl perbenzoate, 2,2-bis(tert-butylperoxy)butene, 4,4-di-tert-butylperoxy nonylvalerate, dicumyl peroxide, 2,5-dimethyl-2,5-di(tert-butylperoxy)hexane, tert-butyl cumyl peroxide, 1,3-bis(tert-butylperoxyisopropyl)benzene, di-tert-butyl peroxide and 2,5-dimethyl-2,5-di(tert-butylperoxy)-3-hexyne.

It may be advantageous to employ not only these peroxidic crosslinkers but also further additions capable of increasing the crosslinking yield: suitable therefor are for example triallyl isocyanurate, triallyl cyanurate, trimethylolpropane tri(meth)acrylate, triallyl trimellitate, ethylene glycol dimethacrylate, butanediol dimethacrylate, zinc diacrylate, zinc dimethacrylate, 1,2-polybutadiene or N,N'-m-phenylenebismaleimide.

The total amount of peroxidic crosslinker(s) is typically in the range from 1 to 20 phr, preferably in the range from 1.5 to 15 phr and particularly preferably in the range from 2 to 10 phr based on the PEG acrylate-HNBR copolymer according to the invention.

Suitable crosslinkers also include sulfur in elemental soluble or insoluble form or sulfur donors.

Suitable sulfur donors include for example dimorpholyl disulfide (DTDM), 2-morpholinodithiobenzothiazole (MBSS), caprolactam disulfide, dipentamethylenethiuram tetrasulfide (DPTT) and tetramethylthiuram disulfide (TMTD).

Even for sulfur vulcanization of the PEG acrylate-HNBR copolymers according to the invention it is possible to use further additions capable of increasing the crosslinking yield. However, in principle the crosslinking may also be effected solely with sulfur or sulfur donors.

Conversely the crosslinking of the PEG acrylate-HNBR copolymers of the invention may also be effected solely in the presence of the abovementioned additions, i.e. without addition of elemental sulfur or sulfur donors.

Suitable additions capable of increasing the crosslinking yield include for example dithiocarbamates, thiurams, thiazoles, sulfenamides, xanthates, guanidine derivatives, caprolactams and thiourea derivatives.

Employable dithiocarbamates include for example: ammonium dimethyldithiocarbamate, sodium diethyldithiocarbamate (SDEC), sodium dibutyldithiocarbamate (SDBC), zinc dimethyldithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (ZSMC), tellurium diethyldithiocarbamate, nickel dibutyldithiocarbamate, nickel dimethyldithiocarbamate and zinc diisononyldithiocarbamate. Employable thiurams include for example: tetramethylthiuram disulfide (TMTD), tetramethylthiuram monosulfide (TMTM), dimethyldiphenylthiuram disulfide, tetrabenzylthiuram disulfide, dipentamethylenethiuram tetrasulfide and tetraethylthiuram disulfide (TETD). Employable thiazoles include for example: 2-mercaptobenzothiazole (MBT), dibenzothiazyl disulfide (MBTS), zinc mercaptobenzothiazole (ZMBT) and copper 2-mercaptobenzothiazole. Employable sulfenamide derivatives include for example: N-cyclohexyl-2-benzothiazyl sulfenamide (CBS), N-tert-butyl-2-benzothiazyl sulfenamide (TBBS), N,N'-dicyclohexyl-2-benzothiazyl sulfenamide (DCBS), 2-morpholinothiobenzothiazole (MBS), N-oxydiethylenethiocarbamyl-N-tert-butyl sulfenamide and oxydiethylenethiocarbamyl-N-oxyethylene sulfenamide. Employable xanthates include for example: sodium dibutyl xanthate, zinc isopropyl dibutyl xanthate and zinc dibutyl xanthate. Employable guanidine derivatives include for example: diphenylguanidine (DPG), Di-o-tolylguanidine (DOTG) and o-tolyl biguanide (OTBG). Employable dithiophosphates include for example: zinc dialkyldithiophosphates (chain length of alkyl radicals C2 to C16), copper dialkyldithiophosphates (chain length of alkyl radicals C2 to C16) and dithiophosphoryl polysulfide. Employable caprolactams include for example dithiobiscaprolactam. Employable thiourea derivatives include for example N,N'-diphenylthiourea (DPTU), diethylthiourea (DETU) and ethylenethiourea (ETU). Additions that are likewise suitable include for example: zinc diamine diisocyanate, hexamethylenetetramine, 1,3-bis(citraconimidomethyl)benzene and cyclic disulfanes.

The recited additions and the crosslinking agents may be employed either individually or in mixtures. It is preferable to employ the following substances for the crosslinking of the PEG acrylate-HNBR copolymer according to the invention: sulfur, 2-mercaptobenzothiazole, tetramethylthiuram disulfide, tetramethylthiuram monosulfide, zinc dibenzyldithiocarbamate, dipentamethylenethiuram tetrasulfide, zinc dialkydithiophosphate, dimorpholyl disulfide, tellurium diethyldithiocarbamate, nickel dibutyldithiocarbamate, zinc dibutyldithiocarbamate, zinc dimethyldithiocarbamate and dithiobiscaprolactam.

The crosslinking agents and the additions recited above may in each case be employed in amounts of 0.05 phr to 10 phr, preferably 0.1 phr to 8 phr, in particular 0.5 phr to 5 phr, (single metered addition in each case based on the active substance) based on the PEG acrylate-HNBR copolymer according to the invention.

In addition to the crosslinking agents and additions recited above it may also be useful to co-use in the sulfur crosslinking further inorganic or organic substances, for example: zinc oxide, zinc carbonate, lead oxide, magnesium oxide, calcium oxide, saturated or unsaturated organic fatty acids and zinc salts thereof, polyalcohols, amino alcohols, for example triethanolamine, and amines, for example dibutylamine, dicyclohexylamine, cyclohexylethylamine, polyamines and polyetheramines.

Other Optional Components:

Such vulcanizable mixtures may optionally also contain one or more additives and fibrous materials familiar to those skilled in the art for rubbers. These comprise ageing inhibitors, reversion inhibitors, light stabilizers, antiozonants, processing assistants, mould release agents, plasticizers, mineral oils, tackifiers, blowing agents, dyes, pigments, waxes, resins, extenders, fillers, for example barium sulfate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, graphene, Teflon (the latter preferably in powder form), or silicates, carbon blacks, silicas, pyrogenic silica, silica, silanized silica, natural products, for example alumina, kaolins, wollastonite, organic acids, vulcanization retarders, metal oxides, strength members (fibres) made of glass, cords, fabric, fibres made of aliphatic and aromatic polyamides (Nylon®, Aramid®), polyesters and natural fibre products, salts of unsaturated carboxylic acids, for example zinc diacrylate (ZDA), zinc methacrylates (ZMA) and zinc dimethylacrylate (ZDMA), liquid acrylates or other additives known in the rubber industry (Ullmann's Encyclopedia of Industrial Chemistry, VCH Verlagsgesellschaft mbH, D-69451 Weinheim, 1993, vol. A 23 "Chemicals and Additives", pp. 366-417).

Contemplated filler activators include in particular organic silanes, for example vinyltrimethyloxysilane, vinyldimethoxymethylsilane, vinyltriethoxysilane, vinyltris(2-methoxyethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Filler activators further include for example surface-active substances such as triethanolamine and ethylene glycols having molecular weights of 74 to 10 000 g/mol. The amount of filler activators is typically 0 to 10 parts by weight based on 100 parts by weight of the PEG acrylate-HNBR copolymer according to the invention.

The total amount of additives and fibres is typically in the range from 1 to 300 parts by weight based on 100 parts by weight of the PEG acrylate-HNBR copolymer according to the invention.

Processes for Producing Vulcanizable Mixtures Containing PEG Acrylate-HNBR Copolymer The present invention further provides a process for producing vulcanizable mixtures containing PEG acrylate-HNBR copolymer according to the invention by mixing the PEG acrylate-HNBR copolymer according to the invention with at least one crosslinker and the optionally present further components. This mixing operation may be performed in any mixing apparatuses customary in the rubber industry, for example internal mixers, Banbury mixers or roller mills. The sequence of metered addition may be readily determined by those skilled in the art through suitable experiments.

By way of example, two variants for the possible procedure are described hereinafter:

Process A: Production in Internal Mixer

Internal mixers with intermeshing rotor geometry are preferred.

At commencement the internal mixer is charged with the PEG acrylate-HNBR copolymer according to the invention in bale form and the bales are comminuted. After a suitable mixing time the fillers and additives are added. Mixing is carried out under temperature control with the proviso that the mixture is held at a temperature in the range from 80° C. to 150° C. for a suitable time. After a further suitable mixing period, the further mixture constituents are added, such as optionally stearic acid, antioxidants, plasticizers, white pigments (for example titanium dioxide), dyes and other processing aids. After a further suitable mixing period the internal mixer is ventilated and the shaft is cleaned. After a further suitable period, the internal mixer is emptied to obtain the vulcanizable mixture. Suitable periods are to be understood as meaning a few seconds to a few minutes. The crosslinking chemicals may either be incorporated by mixing in a separate step in a roller mill, especially when mixing is performed at an elevated mixing temperature, or added directly into the internal mixer. It must be ensured that the mixing temperature is below the reaction temperature of the crosslinking chemicals.

The thus produced vulcanizable mixtures may be evaluated in customary fashion, for example via Mooney viscosity, via Mooney scorch or via a rheometer test.

Process B: Production on the Roller Mill

If roller mills are used as mixing apparatuses the PEG acrylate-HNBR copolymer according to the invention is applied to the roller first. Once a homogeneous milled sheet has been formed, the fillers, plasticizers and other additives with the exception of the crosslinking chemicals are added. After incorporation of all components by mixing, the crosslinking chemicals are added and incorporated by mixing. The mixture is then incised three times on the right and three times on the left and toppled over 5 times. The finished milled sheet is milled to the desired thickness and subjected to further processing according to the desired test methods.

Process for Producing Vulcanizates Based on PEG Acrylate-HNBR Copolymer

The invention further provides the process for producing vulcanizates, preferably as mouldings, containing PEG acrylate-HNBR copolymer according to the invention (vulcanization), characterized in that it comprises subjecting the vulcanizable mixture containing PEG acrylate-HNBR copolymer according to the invention to a vulcanization, preferably in a moulding process and more preferably at temperatures in the range from 100° C. to 250° C., particularly preferably at temperatures in the range from 120° C. to 250° C. and very particularly preferably temperatures in the range from 130° C. to 250° C. To this end the vulcanizable mixtures are subjected to further processing with calenders, rollers or extruders. The preformed mass is then vulcanized in presses, autoclaves, hot air systems or in so-called automatic matt vulcanization plants ("Aurna"), wherein temperatures in the range from 100° C. to 250° C. have proven preferred, temperatures in the range from 120° C. to 250° C. have proven particularly preferred and temperatures in the range from 130° C. to 250° C. have proven very particularly preferred. The vulcanization time is typically 1 minute to 24 hours and preferably 2 minutes to 1 hour. Depending on the shape and size of the vulcanizates, a second vulcanization by reheating may be necessary to achieve complete vulcanization.

The invention further provides the thus obtainable vulcanizates based on the PEG acrylate-HNBR copolymer according to the invention.

The invention also provides for the use of the vulcanizates based on the the PEG acrylate-HNBR copolymers according to the invention for producing mouldings selected from the group consisting of belts, seals, rollers, shoe components, hoses, damping elements, stators and cable sheaths, preferably belts and seals.

The invention accordingly provides vulcanizates as mouldings containing PEG acrylate-HNBR copolymer according to the invention which are preferably selected from belts, seals, rollers, shoe components, hoses, damping elements, stators and cable sheaths, particularly preferably belts and seals. The methods employable to this end by way of example such as moulding, injection moulding or extrusion processes and the corresponding injection moulding apparatuses or extruders are well known to those skilled in the art. In the production of these mouldings the PEG acrylate-HNBR copolymers according to the invention may be supplemented with the standard auxiliaries known to those skilled in the art and suitably selectable using their customary knowledge of the art, for example fillers, filler activators, accelerators, crosslinkers, antiozonants, antioxidants, processing oils, extender oils, plasticizers, activators or scorch inhibitors.

The advantage of the invention is in particular that the PEG acrylate-HNBR copolymers according to the invention have an unexpectedly low Mooney viscosity and are thus particularly suitable for further processing, in particular for producing vulcanizates.

EXAMPLES

Materials Employed

The following chemicals were purchased as commercial products from the companies specified in each case or originate from production plants of the companies specified.

| | |
|---|---|
| Acrylonitrile | CAS Number 107-13-1 |
| Butadiene | CAS Number 106-99-0 |
| BDGMA | Butoxy diethylene glycol methacrylate (BDGMA), molecular weight 230.3 g/mol (commercially available from Evonik Industries AG) |
| Corax ® N330 | Carbon black (commercially available from Orion Engineered Carbon)) |
| Rhenofit ® DDA 70 | 70% Styrenated diphenylamine bonded to 30% silica (commercially available from LANXESS) |
| Vulkanox ® ZMB2/C-5 | Zinc salt of 4- and 5-methyl-2-mercaptobenzothiazole; (commercially available from LANXESS) |
| MgO | Magnesium oxide (commercially available from CP Hall) |
| TAIC-70 | Triallyl isocyanurate, 70% masterbatch; supported on silica (commercially available from Kettlitz) |
| Perkadox ® 14-40 | Di(tert-butylperoxyisopropyl)benzene 40% supported on silica; (commercially available from Akzo Nobel Polymer Chemicals BV) |
| Polystay 29 | Styrenated diphenylamine; (commercially available from Goodyear Chemical) |
| Vulkanox ® BKF | 2,2'-Methylene-bis(4-methyl-6-tert-butylphenol) (commercially available from LANXESS) |
| Disponil ® SDS G | sodium lauryl sulfate (commercially available from BASF) |
| Na salt of disproportionated resin acid CAS Number 61790-51-0 | |
| Na salt of fatty acid | |
| $Na_2CO_3$ | Sodium carbonate (commercially available from Merck KGaA) |
| KCl | Potassium chloride (commercially available from VWR) |
| EDTA | Ethylenediaminetetraacetic acid (commercially available from VWR) |
| Glidox ® 500 | 2,6,6-Trimethylbicyclo[3.1.1]heptyl hydroperoxide (para-hydroxypinane) (commercially available from Symrise) |
| Monochlorobenzene (MCB) | (commercially available from VWR) |
| Wilkinson's catalyst | Chloridotris(triphenylphosphine)rhodium(I), $C_{54}H_{45}ClP_3Rh$, CAS Number 14694-95-2 (commercially available from Umicore) |
| Triphenylphosphine (TPP) | $C_{18}H_{15}P$; CAS Number 603-35-0 (commercially available from VWR) |

Methods of Measurement

The glass transition temperature was obtained by means of a DSC measurement according to ASTM E 1356-03 or according to DIN 53765. To this end, between 10 mg and 15 mg of the sample were weighed into an aluminium boat and sealed. The boat was heated twice from −150° C. to 150° C. at a heating rate of 10 K/min in a DSC instrument from TA Instruments. The glass transition temperature was determined from the second heating curve by the standard mean value method.

The RDB content (residual double bond content) in % is determined by the following FT-IR measurement: the IR spectra of the nitrile-butadiene copolymer before, during and after the hydrogenation are recorded by means of an AVATAR 360 Thermo Nicolet FT-IR spectrometer IR instrument. To this end a monochlorobenzenic solution of the nitrile-butadiene copolymer is applied to an NaCl platelet, dried to a film and analysed. The degree of hydrogenation is determined by FT-IR analysis according to the ASTM D 567095 method.

Molecular weight is determined by gel permeation chromatography (GPC). A modular system comprising a Shodex RI-71 differential refractometer, S 5200 autosampler (from SFD), column oven (ERC-125), Shimadzu LC 10 AT pump and a column combination of 3 PLgel 10 μm Mixed B 300×7.5 mm from Agilet was used. The solvent used was tetrahydrofuran; the molecular weights present are based on polystyrene standards from PSS (Mainz). The finished THF sample solutions are filtered through syringe filters having 0.45 μm PTFE membranes and diameter 25 mm. The measurements were conducted at 40° C. and a flow rate of 1 ml/min in tetrahydrofuran. The molecular parameters such as number-average molecular weight $M_n$, mass-average molecular weight $M_w$ and the resulting polydispersity index PDI are determined from the RI signal by means of the "Empower 2 data base" software from Waters.

The nitrogen content for determining ACN content in the nitrile rubbers is determined by Vario EL cube. Combustion of the amount weighed out in the CHN machine at about 1150° C. in the presence of oxidation catalysts and oxygen, aliquoting of the combustion gases, absorption of the disruptive components and detection of N2 by thermal conductivity measurement cell (TCD).

The microstructure and the termonomer content of the individual polymers were determined by means of 1H-NMR (instrument: Bruker DPX400 with TopSpin 1.3 software, measurement frequency 400 MHz, solvent 1,1,2,2-tetrachloroethane-d2).

The noble metal content (Rh or Ru) of the HNBR was determined using a sample amount of 0.5 g of HNBR which was ashed at 550° C. in a platinum crucible. The residue was dissolved in hydrochloric acid and diluted with water. The content of ruthenium and rhodium was determined by ICP-OES (inductively coupled plasma optical emission spectrometry) at the characteristic wavelengths for ruthenium and rhodium. Calibration was carried out with acidic solutions of the corresponding metals at the specified wavelengths. Before determination of the content of the samples the signal heights and the sample concentrations were adapted in order to be able to perform the measurement in the linear region of the calibration curve.

The content of emulsifier is determined from the precipitation serum of the dissolved HNBR precipitated with methanol by gas chromatography (GC). To this end, the emulsifiers in the precipitation serum are initially silylated and subsequently analyzed using a gas chromatograph having a flame ionization detector coupled to a mass spectrometer.

Mooney viscosity values (ML1+4@100° C.) are in each case determined by means of a shearing disc viscometer according to ASTM D1646-07.

The vulcanization behaviour of the mixtures/the crosslinking density was measured with a moving die rheometer (MDR 2000E), measurement being carried out for 30 minutes at 180° C. at an angle of 0.5° and an oscillation frequency of 1.7 Hz.

For tensile testing 2 mm sheets were produced by vulcanization of the vulcanizable mixture at 180° C. The dumbbell-shaped test specimens were stamped out of these sheets and tensile strength and elongation were determined according to ASTM D2240-81.

Hardness was determined according to ASTM D2240-81 using a Durometer.

To determine swelling, dumbbell-shaped test specimens as used for tensile testing were stored in IRM903 at 150° C. for 168 hours according to DIN ISO 1817. The samples were subsequently measured and weighed and volume swelling and mass increase were determined. This was followed by determination of tensile strength and elongation according to ASTM D2240-81.

The abbreviations appearing in the tables which follow have the following meanings:

| | |
|---|---|
| "S min" | is the minimum torque of the crosslinking isotherm |
| "S max" | is the maximum torque of the crosslinking isotherm |
| "Delta S" | is "S max − S min" |
| "M 10" | modulus at 10% elongation, measured at RT |
| "M 25" | modulus at 25% elongation, measured at RT |
| "M 50" | modulus at 50% elongation, measured at RT |
| "M 100" | modulus at 100% elongation, measured at RT |
| "M 300" | modulus at 300% elongation, measured at RT |
| "EB" | elongation at break measured at RT |
| "TS" | tensile strength measured at RT |
| "H" | hardness measured at RT |

Production Process
Production of NBR Latex and PEG Acrylate-NBR Latex

Production of the nitrile rubber latices L1 and L2 employed in the following series of examples was carried out according to the base formulation reported in table 1, wherein all input materials are reported in percent by weight based on 100% by weight of the monomer mixture (phm). Table 1 also specifies the respective polymerization conditions.

TABLE 1

Polymerization constituents and conditions for production of the nitrile rubber latices (L1 and L2) (inventive examples marked with an asterisk *).

| Polymerization constituents | L1 | L2* |
|---|---|---|
| Butadiene | 65 | 31 |
| Acrylonitrile | 35 | 18 |
| Butoxy diethylene glycol methacrylate | — | 51 |
| Total amount of water | 200 | 190 |
| Disponil ® SDS G | — | 2.4 |
| Na salt of disproportionated resin acid | — | 0.5 |
| Na salt of fatty acid | 2.0 | — |
| Na₂CO₃ | — | 0.12 |
| KCl | 0.125 | — |
| PH | 11.2 | 10.9 |
| t-DDM | 0.63 | 0.25 |
| Glidox ® 500 (para-hydroxypinane) | 0.02 | 0.02 |
| Premix solution FeSO₄ | 0.018 | 0.02 |
| Diethylhydroxylamine | 0.2 | 0.2 |
| EDTA | | |
| Polymerization conditions | | |
| Polymerization temperature [° C.] | 12 | 12 |
| Polymerization conversion [%] | 73 | 75 |
| Polymerisation time [h] | 5.75 | 6.5 |

Production of the nitrile rubber latices was carried out discontinuously in a 20 L autoclave fitted with a stirrer. EDTA was used equimolarly based on the Fe-II. 90% of the total water amount and also the emulsifier were initially charged in the autoclave and purged with a nitrogen stream. Subsequently, the destabilized monomers and the amount of the molecular weight regulator t-DDM reported in table 1 were added and the reactor was closed. After thermostatting the reactor contents the polymerizations were initiated by addition of the premix solutions and of para-hydroxypinane (Glidox® 500). The progress of the polymerization was monitored by gravimetric conversion determinations. Upon achieving the target conversion the polymerization was terminated by addition of an aqueous solution of diethylhydroxylamine. Unconverted monomers and other volatile constituents were removed by steam distillation. Characterization of the material with reference to the Mooney viscosity, the ACN content, the termonomer content and the glass transition temperature was carried out using the sample precipitated with $CaCl_2$.

Latex Precipitation of L1 and L2 with CaCl$_2$

In a 20 L precipitation vessel CaCl$_2$) (4 phr) and water were initially charged (20 phr) and heated to 60° C. for L1. The solution is not heated for L2. With vigorous stirring at 1000 rpm the diluted latex (17.5%) is slowly added dropwise into the coagulation solution (precipitation of L1 to afford NBR 1; precipitation of L2 to afford NBR 2). Upon completion of the 10 min of further stirring time the rubber is filtered through a 1 mm sieve and washed with water (20 phr). For NBR 1 this water is in turn heated to 60° C. The precipitated NBR rubbers NBR 1 and NBR 2 are in turn filtered through the 1 mm sieve, trayed and in a vacuum drying cabinet dried to a residual moisture content of <0.5% at 55° C. for about 48 hours.

TABLE 2

Properties of the precipitated nitrile rubbers (NBR 1 und 2) (inventive examples marked with an asterisk *)

| NBR | 1 | 2* |
|---|---|---|
| ACN content [% by weight] | 34 | 16 |
| Mooney viscosity ML(1 + 4@100° C.) (MU) | | <10 |
| Termonomer | — | BDGMA |
| Termonomer incorporation [% by weight] | — | 49 |
| Glass transition temperature Tg [° C.] | −24.5 | −39.6 |

Hydrogenation

The previously synthesized nitrile rubbers were in each case subjected to a solution hydrogenation and a latex hydrogenation.

Latex Hydrogenation: Hydrogenation of L1 and L2 (Inventive)

The following hydrogenations were performed using the previously synthesized nitrile rubber latices (L1 and L2).

The hydrogenations were performed in a 2 L high-pressure reactor under the following conditions:

| | |
|---|---|
| Solvent: | Water |
| Solids concentration: | 15-20% by weight |
| Reactor temperature: | 120° C. |
| Reaction time: | 1-3 hours (until RDB is <1%) |
| Catalyst & loading: | Grubbs-Hoveyda-II: 0.03 phr (L1); 0.09 phr (L2) |
| Hydrogen pressure (p H$_2$): | 8.4 MPa |
| Stirrer speed: | 600 rpm |

The catalyst was dissolved in 5-15 mL of toluene and transferred into a pressure burette.

The nitrile rubber latices L1 and L2 were purged with H$_2$ (23° C., 2 MPa) three times in the reactor with vigorous stirring. The reactor was subsequently heated to a starting temperature of 100° C. at a stirrer speed of 600 min$^{-1}$ and the catalyst solution was injected into the reactor via the glass burette using nitrogen. The hydrogen pressure was increased stepwise to 8.4 MPa and the internal reactor temperature was adjusted to 120° C. after the reaction had started.

The reaction was terminated after 1 or 2 hours upon achieving an RDB content of <1% by releasing the hydrogen pressure.

Coagulation of the HNBR with CaCl$_2$

In a 5 L precipitation vessel CaCl$_2$ (4 phr) and water are initially charged (20 phr) and heated to 60° C. for HNBR 1. The solution is not heated for HNBR 2. With vigorous stirring at 1000 rpm the diluted latex (17.5%) is slowly added dropwise into the coagulation solution. Upon completion of the 10 min of further stirring time the rubber is filtered through a 1 mm sieve and washed with water (20 phr). For HNBR 1 this water is in turn heated to 60° C. The polymer is in turn filtered through the 1 mm sieve, trayed and in a vacuum drying cabinet dried to a residual moisture content of <0.5% at 55° C. for about 48 hours.

Solution Hydrogenation: Hydrogenation of NBR 1 and NBR 2 (Noninventive)

The following solution hydrogenations were performed using the previously synthesized and precipitated nitrile rubber (NBR 1 and NBR 2).

The hydrogenations were performed in a 10 L high-pressure reactor under the following conditions:

| | |
|---|---|
| Solvent: | Monochlorobenzene |
| Solids concentration: | 12-13% by weight of polymer in MCB |
| Reactor temperature: | 137-140° C. |
| Reaction time: | 3 hours |
| Catalyst & loading: | Wilkinson's catalyst: 0.065 phr; Co-catalyst: triphenylphosphine: 1.0 phr |
| Hydrogen pressure (p H$_2$): | 8.4 MPa |
| Stirrer speed: | 600 rpm |

In the reactor the nitrile rubber solution was purged with H$_2$ (23° C., 2 MPa) three times with vigorous stirring. The temperature of the reactor was increased to 100° C. and the H$_2$ pressure was increased to 6 MPa. 123.9 g of a chlorobenzenic solution of Wilkinson's catalyst (0.065 phr) and triphenylphosphine (1 phr) were added and the pressure was raised to 8.4 MPa while the reactor temperature was adjusted to 137-140° C. Both parameters were kept constant during the reaction. The progress of the reaction was monitored by measurement of the residual double bond content (RDB) by IR spectroscopy. The reaction was terminated after 3 hours upon achieving an RDB content of <1% by releasing the hydrogen pressure.

Steam Coagulation

The hydrogenated nitrile rubber thus formed was isolated from the solution by steam coagulation. To this end the chlorobenzenic solution was diluted to a polymer content of 7% by weight and continuously metered into a stirred glass reactor filled with water and preheated to 100° C. Steam was simultaneously introduced into the coagulation water at a pressure of 0.5 bar. The thus precipitated polymer crumb was roughly dewatered and subsequently dried to a constant weight under vacuum at 55° C.

Composition and Properties of the Hydrogenated Nitrile Rubbers

Properties of the HNBR copolymers produced by solution and latex hydrogenation are shown in table 3.

TABLE 3

Properties of the HNBR copolymers

| | Solution hydrogenation HNBR copolymer 1 | Latex hydrogenation HNBR copolymer 2 |
|---|---|---|
| ACN [% by weight] | 34 | 34 |
| BD [% by weight] | 66 | 66 |
| PEG acrylate [% by weight] | — | — |
| ML 1 + 4 [MU] | 75 | 89 |
| Tg [° C.] | −24 | −24 |
| Gel content [%] | 2.5 | 3.8 |
| Noble metal content [ppm] | 77 (Rh) | 25 (Ru) |
| Emulsifier content [%] | 2.2 | 2.0 |

In NBR copolymers performance of the latex hydrogenation results in a slight increase (and thus worsening) in the Mooney viscosity of the produced HNBR.

Properties of the PEG acrylate-HNBR copolymers produced by solution and latex hydrogenation are shown in table 4.

TABLE 4

Properties of the PEG acrylate-HNBR copolymers

| | Solution hydrogenation PEG acrylate-HNBR copolymer 1 | Latex hydrogenation PEG acrylate-HNBR copolymer 2 |
|---|---|---|
| ACN [% by weight] | 16 | 16 |
| BD [% by weight] | 35 | 35 |
| PEG acrylate [% by weight] | 49 | 49 |
| ML 1 + 4 [MU] | 61 | 13 |
| Tg [° C.] | −50.4 | −49 |
| Gel content [%] | 4.7 | 2.5 |
| Noble metal content [ppm] | 91 (Rh) | 60 (Ru) |
| Emulsifier content [%] | n.d. | n.d. | n.d. not detectable

Production of PEG acrylate-NBR copolymers via latex hydrogenation results in a drastic reduction and thus improvement in the Mooney viscosity of the produced PEG acrylate-HNBR copolymer compared to PEG acrylate-HNBR copolymers produced by solution hydrogenation.

Production of the Vulcanizable HNBR Compositions

All HNBR compositions were produced on a mixing mill. The diameter of the rollers was 80 mm, the length 200 mm. The rollers were preheated to 40° C., the speed of the front roller was 16.5 rpm and the speed of the rear roller was 20 rpm thus achieving a friction of 1:1.2.

The rubber was initially charged and mixed for one (1) minute until a smooth milled sheet was formed. This was followed by incorporation of initially the carbon black, then the additives and finally the crosslinking chemicals by mixing. The mixing time was 5 to 8 minutes in total.

Production of the HNBR Vulcanizates (Vulcanization)

The thus-produced vulcanizable mixtures were used to produce sheets of 2 mm in thickness by vulcanization at 180° C. for 10 min. The test specimens were stamped from these sheets.

TABLE 5

Composition and properties of the vulcanizates V1 to V4

| | V1 | V2* | V3 | V4* |
|---|---|---|---|---|
| HNBR copolymer 1 (solution hydrogenated) | 100 | | | |
| HNBR copolymer 2 (latex hydrogenated) | | 100 | | |
| PEG acrylate-HNBR copolymer (solution hydrogenated) | | | 100 | |
| PEG acrylate-HNBR copolymer (latex hydrogenated) | | | | 100 |
| N330 | 30 | 30 | 30 | 30 |
| Rhenofit ® DDA 70 | 1.4 | 1.4 | 1.4 | 1.4 |
| ZMB2 | 0.4 | 0.4 | 0.4 | 0.4 |
| MgO | 2 | 2 | 2 | 2 |
| TAIC | 1.5 | 1.5 | 1.5 | 1.5 |
| Perkadox ® 14-40 | 7 | 7 | 7 | 7 |
| Vulcanizate properties | V1 | V2 | V3 | V4 |
| S' min | 1.33 | 1.6 | 0.97 | 1.17 |
| S' max | 21.59 | 20.83 | 8.72 | 9.82 |
| Delta S' | 20.26 | 19.23 | 7.75 | 8.65 |
| Volume swelling [%] | 19.6 | 20.2 | 33.2 | 31.9 |
| Hardness [ShA] | 63 | 63 | 50 | 47 |
| M10 [MPa] | 0.6 | 0.6 | 0.3 | 0.3 |
| M25 [MPa] | 1 | 1 | 0.6 | 0.5 |
| M50 [MPa] | 1.4 | 1.4 | 0.9 | 0.7 |
| M100 [MPa] | 2.7 | 2.6 | 2.3 | 1.7 |
| M300 [MPa] | — | — | — | — |
| Elongation at break (EB) [%] | 281 | 281 | 198 | 229 |
| Tensile strength (TS) [MPa] | 23.3 | 23.1 | 9.3 | 9.5 |

"S' min" is the minimum torque of the crosslinking isotherm
"S' max" is the maximum torque of the crosslinking isotherm
"Delta S'" is "S max − S min"

HNBR and PEG acrylate-HNBR copolymers produced by latex hydrogenation exhibit a lower Mooney viscosity in the unvulcanized polymer than the types produced by solution hydrogenation. Hydrogenated nitrile rubber copolymers having lower Mooney viscosities have the advantage that they are easier to process.

Vulcanizates of the latex-hydrogenated nitrile rubber copolymers exhibit a comparable hardness and volume swelling to the solution-hydrogenated nitrile rubber copolymers and are thus comparable in terms of their profile of properties and field of application.

Production of PEG acrylate-HNBR copolymers is possible both by solution hydrogenation and by latex hydrogenation. However, latex hydrogenation has the clear advantage over solution hydrogenation that in the case of hydrogenated nitrile rubber copolymers produced by latex hydrogenation the Mooney viscosity is markedly lower than in the case of PEG acrylate-HNBR copolymer produced by solution hydrogenation

The invention claimed is:

1. A process for producing a PEG acrylate-HNBR copolymer, comprising subjecting a PEG acrylate-NBR latex to a hydrogenation and subsequently a coagulation, wherein the PEG acrylate-NBR latex contains
   (a) 10% to 60% by weight of at least one α,β-ethylenically unsaturated nitrile unit,
   (b) 20% to 80% by weight of at least one conjugated diene unit, and
   (c) 30% to 60% by weight of a PEG acrylate unit derived from a PEG acrylate of general formula (I)

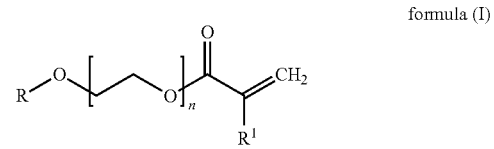

formula (I)

based on the total amount of monomer units,
wherein
R is hydrogen or branched or unbranched C1-C20-alkyl
n is 1 to 8, and
R1 is hydrogen or methyl.

2. The process according to claim 1, wherein an amount of the at least one α,β-ethylenically unsaturated nitrile units is 15% to 40% by weight, based on the total amount of monomer units.

3. The process according to claim 1, wherein an amount of the at least one conjugated diene unit is 30% to 65% by weight, based on the total amount of monomer units.

4. The process according to claim 1, wherein an amount of the PEG acrylate unit derived from the PEG acrylate of general formula (I) is 30% to 50% by weight, based on the total amount of monomer units.

5. The process according to claim 1, wherein the PEG acrylate-NBR latex contains 15% to 35% by weight of the at least one α,β-ethylenically unsaturated nitrile unit, 35% to 60% by weight of the at least one conjugated diene unit, and 30% to 50% by weight of the PEG acrylate unit derived from the PEG acrylate of general formula (I).

6. The process according to claim 1, wherein the PEG acrylate unit derived from a PEG acrylate of general formula (I) is a unit derived from ethoxy, butoxy or ethylhexyloxy polyethylene glycol (meth)acrylate having 2 to 12 ethylene glycol repeating units.

7. The process according to claim 1, wherein the PEG acrylate-NBR latex comprises acrylonitrile units, butadiene units and butoxy polyethylene glycol (meth)acrylate units.

8. The process according to claim 1, wherein the PEG acrylate-NBR latex has a solids concentration of 10% to 50% by weight, based on the total weight of the PEG acrylate-NBR latex.

9. The process according to claim 1, wherein the hydrogenation is carried out in the presence of a hydrogenation catalyst of general formula B,

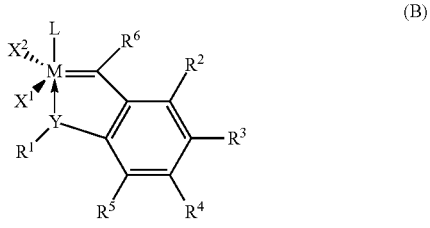

(B)

wherein
M is ruthenium,
X1 and X2 are identical or different anionic ligands,
L is an N-heterocyclic carbene (NHC) ligand,
R2, R3, R4 and R5 are identical or different and are in each case hydrogen, alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulfonyl, or alkylsulfinyl, wherein these radicals are in each case optionally substituted with one or more alkyl, halogen, alkoxy, aryl or heteroaryl radicals, or alternatively the two radicals R together with the common carbon atom to which they are bonded are bridged to form a cyclic group which may have an aliphatic or aromatic nature, which may be substituted and which may comprise one or more heteroatoms
Y is oxygen (O), sulfur (S), an N-R1 radical or a P-R1 radical, wherein R1 is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulfonyl or alkylsulfinyl radical in each case optionally substituted with one or more alkyl, halogen, alkoxy, aryl or heteroaryl radicals and
R6 is hydrogen or an alkyl, alkenyl or aryl radical.

10. The process according to claim 1, wherein the hydrogenation is carried out in the presence of sodium dodecyl sulfate (SDS).

11. The process according to claim 1, wherein the hydrogenation is carried out at a pressure of 5 to 15 MPa.

12. The process according to claim 1, wherein the hydrogenation is carried out at a temperature of 100° C. to 150° C.

13. The process according to claim 1, wherein a duration of the hydrogenation is 1 to 10 hours.

14. A PEG acrylate-HNBR copolymer obtained by the process according to claim 1.

\* \* \* \* \*